United States Patent Office 3,819,699
Patented June 25, 1974

3,819,699
PURIFICATION OF LYSINE AMIDE OR CARBOXYLATE SALTS THEREOF
Fred W. Koff, Clifton, and John Pisanchyn, Morristown, N.J., assignors to Allied Chemical Corporation, New York, N.Y.
No Drawing. Filed Dec. 29, 1971, Ser. No. 215,961
Int. Cl. C07c 103/00
U.S. Cl. 260—561 A          6 Claims

ABSTRACT OF THE DISCLOSURE

Methods for the purification of D,L,-lysine amide or carboxylate salts thereof, by forming an adduct with $CO_2$, HCl or HBr, which separates out as a solid.

CROSS REFERENCES TO RELATED APPLICATIONS

This application is related to co-filed applications, Ser. Nos. 215,960, now U.S. Pat. No. 3,746,763, and 215,962 (hereafter referred to as co-filed applications).

BACKGROUND OF THE INVENTION

This application relates to novel methods of purifying crude D,L,-lysine amide. In the co-filed patent applications, methods are given for the preparation of D,L,-lysine amide by the hydrogenation of 2-oximino-6-nitrohexanamide. The lysine amide produced may be readily hydrolyzed top roduce D,L,-lysine, but it is preferable to purify the lysine amide before its resolution into the desired L-enantiomer and recycleable D-enantiomer. The lysine amide crude produced by the methods of the two co-filed applications, contains pipecolinamide and other by-products. Whereas the purification methods of this invention are very effective in removing these byproducts and in producing a highly purified D,L,-lysine amide from the crude lysine amide produced by the methods disclosed in the two co-filed patent applications, this method is nevertheless equally suitable for the purification of lysine amide crude produced by any other means.

SUMMARY OF THE INVENTION

In said co-filed patent applications, methods are disclosed for the hydrogenation of the lysine precursor, 2-oximino-6-nitrohexanamide, to produce D,L,-lysine amide. It is shown in these applications, that this product can be obtained in good yield with minor amounts of associated by-products, the most significant being pipecolinamide. Generally, it is necessary to separate the lysine amide from the pipecolinamide, which is the major impurity, before additional process steps such as resolution and racemization are undertaken. It has now been found that lysine amide may be purified by forming the insoluble $CO_2$ adduct (which is probably a carbamate), and removing this insoluble adduct from the solution by filtration. This is done by contacting a solution of the lysine amide in an appropriate solvent with an excess of carbon dioxide and filtering the insoluble adduct. The impurities are retained in the filtrate. Lysine amide can be regenerated with a stronger acid than $H_2CO_3$. Preferred solvents are alcohols with 1 through 6 carbon atoms, and ethers such as dioxane or mono and dialkyl ethers of glycols such as ethylene glycol dimethyl ether, and aromatic and alkyl aromatic hydrocarbons.

In a second embodiment, the crude lysine amide such as that obtained from the hydrogenation of 2-oximino-6-nitrohexanamide, is also dissolved in an organic solvent, preferably in an alcohol having from 1 to 6 carbon atoms. Rather than carbon dioxide, hydrogen chloride or hydrogen bromide gas is passed into the solution, using 10 to 20% excess over theory. The lysine amide dihydrochloride or dihydrobromide formed, is not precipitated at once, however, as in the case of the $CO_2$ adduct. The solution is cooled, and preferably seeded, whereupon the lysine amide dihydrochloride or dihydrobromide crystallizes out in good yield. Recovery without recycle is in the order of about 85%. The filtrate contains pipe-colinamide and small amounts of other by-products, as well as a small amount of lysine amide dihydrochloride or dihydrobromide which remains in solution. The filtrate can therefore be reconcentrated and recycled in order to improve the over-all yield of D,L,-lysine amide dihydrochloride or dihydrobromide. In the case of either of these two embodiments, the product D,L-lysine amide dihydrochloride is generally the form preferred for further processing. If desired, the D,L,-lysine amide dihydrochloride can be readily reconverted to the free D,L,-lysine amide base, however, by adding sufficient sodium, potassium, or calcium hydroxide to convert the carbamate present to the alkali metal or alkaline earth metal carbonate, then extracting the lysine amide by means of a suitable solvent in which the inorganic salts are insoluble. Suitable solvents are $C_3$-$C_6$ alcohols, dioxane, mono and dialkyl ethers of glycols, and aromatic and alkyl aromatic ($C_6$-$C_{12}$) hydrocarbons. The solvent extracts can be combined and evaporated to dryness, preferably at temperatures not in excess of about 60° C. Suitable alkalies are the hydroxides of ammonium, potassium, sodium, and calcium.

If an excess of an acid such as hydrochloric is added to the adduct, carbon dioxide is evolved, and the product may be isolated as the lysine amide dihydrochloride, which as has been previously stated, is a useful intermediate when the product is to be further processed for the production of D,L,-lysine or L-lysine.

DESCRIPTION OF THE PREFERRED EMBODIMENT 100 parts of crude lysine amide plus such by-products as pipecolinamide, which is also formed in lesser amounts by the hydrogenation methods disclosed in said co-filed U.S. applications, is dissolved in an organic solvent in an amount sufficient to produce a solution having a concentration of between 0.5 to 25%, preferably between 5 and 15%. If a carboxylate salt of lysine amide is to be purified, the carboxylic acid must first be neutralized, using $NH_3$ or another alkali, before precipitating the carbon dioxide adduct. Suitable organic solvents for dissolving the D,L,-lysine amide, are the alcohols having 1 through 6 carbon atoms, or such ethers as dioxane, or the dialkyl ether of an aliphatic diol such as ethyl glycol dimethyl ether. An excess of carbon dioxide gas or solid "Dry Ice" is added to the solution and the solid adduct is precipitated almost quantitatively. This adduct may be removed by filtering or centrifugation. The lysine amide content of this adduct generally represents between about 95 and 98% of the original amount present. The pipecolinamide, small amounts of other by-products and a small amount of lysine amide, remain in solution. If desired, the pipecolinamide may be recovered from the filterate and/or the filtrate may be concentrated and recycled to improve the yield of succeeding batches.

The white lysine amide carbon dioxide adduct may be converted to lysine amide dihydrochloride by the addition of an excess of hydrochloric acid, thus providing a useful form for any further processing which may be anticipated. This conversion is carried out by slurrying or dissolving the lysine amide $CO_2$ adduct in water and adding hydrochloric acid. If it is desired to regenerate free lysine amide from the $CO_2$ adduct, this may be done by the careful addition of ammonium, sodium, potassium, or calcium hydroxide in an amount just sufficient to react with the $CO_2$, to thereby form the alkali or alkaline earth carbonate. The free lysine amide can then be extracted with an organic solvent to separate it from the alkali or alkaline earth metal carbonate formed. The extractions can be combined and evaporated to dryness, preferably at about 40° C., under reduced pressure to obtain the free lysine amide.

In the second embodiment, D,L,-lysine amide dihydrochloride may be obtained either by the treatment of the free lysine amide or a lysine amide carboxylate. Methods for forming these compounds is covered in said co-filed U.S. patent application Ser. No. 215,960. Either type of crude reaction product is dissolved in an alcohol having from 1 to 6 carbon atoms, methanol being preferred. Between 0.5 part and 25 parts of either the free base or carboxylate starting material is dissolved in 100 parts of an alcohol having from 1 to 6 carbon atoms. Preferably 5 to 15 parts are dissolved, and preferably the alcohol is methanol. Anhydrous HCl is then passed into the solution in an amount equal to about a 10–20% excess of the theoretical amount. The solution may be warmed to between about 25° C. and the reflux temperature of the chosen solvent, but after the addition of the hydrogen chloride, the reaction mixture is cooled, preferably below 20° C. The solution may be seeded with a small amount of lysine amide dihydrochloride and permitted to stand until substantially all of the lysine amide dihydrochloride is crystallized out. A yield of about 85% can be anticipated, which may be raised further if the filtrate, which now contains primarily pipecolinamide and smaller amounts of the lysine amide dihydrochloride, is concentrated and recycled to subsequent batches.

Hydrogen bromide can be substituted for the hydrogen chloride, to form D,L,-lysine amide dihydrobromide, and although anhydrous HBr or HCl is preferred, these hydrohalogens can be added as concentrated solutions, either in $H_2O$ or in organic solvents.

If desired, the yield may be increased somewhat, by adding a solvent, miscible with that in which the lysine amide dihydrohalogen is dissolved, but in which said lysine amide dihydrohalogen is relatively insoluble, such as ethyl acetate used with methanol as the primary solvent. If too much of this added solvent is employed, the degree of product purity can be lessened.

EXAMPLE 1

0.413 grams of crude D,L,-lysine amide, being a portion of the product of the hydrogenation of 2-oximino-6-nitrohexanamide, and being contaminated with traces of pipecolinamide, is dissolved in 10 cc. isopropanol with warming and agitation. A small amount of powdered "Dry Ice" is added to the solution, whereupon the evolved carbon dioxide gas precipitates the carbon dioxide adduct of D,L,-lysine amide. The slurry is centrifuged, the precipitate given a wash of isopropanol, then warmed and dried under reduced pressure, and finally treated with HCl to produce D,L,-lysine amide dihydrochloride. Analysis of the original crude indicated it to have a purity of 76%, whereas the D,L,-lysine amide recovered was found to have a purity of 99%.

EXAMPLE 2

0.582 grams of crude D,L,-lysine amide having a purity of 76%, which was prepared as indicated in Example 1, is dissolved in 10 cc. of n-butanol at room temperature. A small amount of powdered Dry Ice is added, and the carbon dioxide adduct of the D,L,-lysine amide separates out on standing overnight. The solids are filtered using a medium glass fritted filter, washed with a little n-butanol, then dried under reduced pressure at 80° C. The carbon dioxide adduct of D,L,-lysine amide is treated with HCl to produce D,L,-lysine amide dihydrochloride.

EXAMPLE 3

A mixture of 0.1031 grams of D,L,-lysine amide and 0.0516 grams of pipecolinamide is dissolved in 15 cc. of dioxane at 60° C. with agitation. The solution is substantially complete. The solution is then cooled to 22° C., and a small stream of $CO_2$ bubbled into the solution for 5 minutes. A white solid addition product separates and is removed from the solution by filtration, washed with a small quantity of dioxane, and dried under reduced pressure at 40° C. Weight—0.1503 grams. Examination of the dry solid and the filtrate by the technique of thin layer chromatography, discloses that 94% of the lysine amide has been recovered in the solid. Only .0063 grams of lysine amide remain in the filtrate, whereas substantially all of pipecolinamide is found there. No pipecolinamide is detected in the white solid.

EXAMPLE 4

0.129 grams of crude D,L,-lysine amide and 0.023 grams of pipecolinamide, the mixture representing a crude having a purity of 85%, is dissolved in 20 cc. of 1,4-dioxane at reflux. After a few minutes at the boiling temperature, the substantially complete solution is cooled to 40° C. A small stream of $CO_2$ is then bubbled through the solution for 5 minutes. A white solid addition product separates and is removed from the solution by filtration, washed with a little dioxane, and dried at 40° C. under reduced pressure. .136 gram of a white powdered adduct is obtained, and treated with HCl to produce D,L,-lysine amide dihydrochloride. The D,L,-lysine amide is now found on analysis to have a purity of 98%, whereas 94% of the D,L,-lysine amide is recovered.

EXAMPLE 5

20 grams of crude lysine amide prepared by the hydrogenation method disclosed in our co-filed U.S. patent application Ser. No. 215,962, and containing 18% pipecolinamide, is dissolved in 100 cc. of n-butanol at 60° C. with agitation. The solution is cooled to ambient temperature, filtered, and an excess of solid carbon dioxide (Dry Ice), is added to the solution, thus allowing the carbon dioxide gas to bubble through the solution until the solid has all been converted to gas. The white solid addition product formed is filtered off and dried at 40° C. under reduced pressure. 26.3 grams of dry white adduct are obtained. The filtrate remaining is found to contain predominantly pipecolinamide.

The 26.3 grams of adduct are slurried with 180 cc. of water. 4N NaOH is added from a burette with agitation to free the lysine amide base, and form sodium carbonate. The solution is extracted three times with 80 cc. portions of benzene. The extracts are combined and evaporated to dryness at about 40° C. under reduced pressure. 15.68 grams of substantially pure lysine amide are obtained. Recovery—95.5%.

EXAMPLE 6

20 grams of crude lysine amide prepared by the two-step hydrogenation procedure disclosed in our co-filed U.S. patent application Ser. No. 215,960, containing 6% pipecolinamide, are dissolved in 200 cc. of isopropanol at 60° C., with agitation. The solution is cooled to ambient temperature, filtered, and carbon dioxide is bubbled into the solution for 10 minutes. The white solid adduct formed is filtered off and dried at 40° C. under reduced pressure. 30.20 grams of dry product are obtained. The filtrate remaining is analyzed, and found to contain predominantly pipecolinamide, on examination by thin layer chromatography.

The dry adduct is slurried with 100 cc. of water, a slight excess of hydrochloric acid is added, and the solution is evaporated to dryness at 40° C. under reduced pressure. 26.68 grams of lysine amide dihydrochloride is obtained, representing about a 95% yield.

EXAMPLE 7

2 grams of the lysine amide adduct with carbon dioxide, prepared by gassing a solution of lysine amide in isopropanol, filtering and evaporating to dryness under partial pressure, is warmed to 80° C. until substantially all of the carbon dioxide has been evolved. 1.22 grams of lysine amide remain, representing about 98% of the original lysine amide content of the carbon dioxide adduct.

EXAMPLE 8

5 grams of lysine amide prepared by the method disclosed in said co-filed U.S. patent application Ser. No. 215,960 and containing 5% pipecolinamide is dissolved in 100 cc. of ethylene glycol dimethyl ether (glyme) at 60° C. 7 grams of solid carbon dioxide (Dry Ice) are added to the solution, and the insoluble adduct of lysine amide and $CO_2$ is filtered off and dried at 40° C. under vacuum. Dry weight: 4.75 grams, yield—95%.

EXAMPLE 9

A small quantity of crude dry lysine amide prepared by the incomplete hydrogenation of 2-oximino-6-nitrohexanamide, is transferred to a 10 cc. flask and dissolved by the addition of 1 cc. of 2N methanolic HCl. The methanolic HCl added is in an amount such that the HCl is in a slight excess over theoretical. Lysine amide dihydrochloride slowly crystallizes out of solution. The crystalline lysine amide dihydrochloride is filtered on a glass frit, washed with methanol, and dried in a vacuum oven at 45° C. to obtain 0.09 gram of lysine amide dihydrochloride. To the filtrate is added 20 cc. of ethyl acetate, which causes the precipitation of an additional 0.028 gram of lysine amide dihydrochloride. Total lysine amide dihydrochloride obtained is 0.111 gram.

Thin layer chromatography (TLC) of the crystallized and the precipitated lysine amide dihydrochloride fractions shows lysine amide and only traces of pipecolinamide. TLC of the remaining filtrate discloses the presence of 6 compounds. The predominant components in the filtrate in decreasing order are: the starting material, pipecolinamide, lysine amide, an unknown compound (probably the hydrogenation intermediate 2-oximino-6-aminohexanamide) and traces of two other compounds. Since the hydrogenation of the 2-oximino-6-nitrohexanamide had been incomplete and rseulted in the presence of at least 6 compounds in the product, an excellent separation of the lysine amide is made from the other 5 compounds by the crystallization of the dihydrochloride from the mixture.

EXAMPLE 10

15 grams of lysine amide acetate prepared according to the method disclosed in said co-filed U.S. patent application Ser. No. 215,962 and containing 19% pipecolinamide is dissolved in 100 cc. of methanol with agitation, and anhydrous HCl is passed into the solution at a temperature of 60° C., and in an amount sufficient to provide a 15% molar excess. The solution is now cooled to 0° C. and allowed to stand until the lysine amide dihydrochloride crystallizes out. The product lysine amide dihydrochloride is filtered off and dried under reduced pressure at 40° C. 12.5 grams of dry lysine amide dihydrochloride is obtained representing about a 87% yield. The filtrate containing a small amount of lysine amide dihydrochloride, but predominantly pipecolinamide hydrochloride, is recycled to the next run.

EXAMPLE 11

15 grams of lysine amide prepared according to the method disclosed in said co-filed U.S. patent application Ser. No. 215,960 and containing about 6% pipecolinamide, is dissolved in 100 cc. of isopropyl alcohol with agitation and warming to 60° C. Anhydrous hydrogen chloride is passed into the solution in an amount sufficient to provide a 15% molar excess. The solution is then cooled to 5° C., seeded with lysine amide dihydrochloride crystals, and allowed to stand 8 hours until substantially all the lysine amide dihydrochloride crystallizes from the solution. The lysine amide dihydrochloride is separated by filtration, and dried under reduced pressure at 40° C. 18.8 grams of substantially pure lysine amide dihydrochloride are obtained, representing a yield of about 89%.

Since certain changes may be made in carrying out the above process, without departing from the scope of the invention, it is intended that all matter contained in the above description shall be interpreted as illustrative and not in a limiting sense.

We claim:
1. A method of separating lysine amide from mixtures containing the same comprising: adding carbon dioxide into a solution of the lysine amide in an organic solvent, to form a solid adduct of the lysine amide with the carbon dioxide and separating the solid adduct.
2. A method of separating lysine amide as a solid adduct with carbon dioxide from a mixture containing the same comprising: dissolving the contaminated lysine amide in an organic solvent selected from the group consisting of dioxane, propanol, isopropanol, n-butanol and isobutanol to a concentration of between 0.5 and 25%, weight basis; allowing carbon dioxide gas to pass through the solution, and separating the solid adduct formed.
3. The method of claim 1 wherein the separated lysine amide adduct of carbon dioxide is treated with hydrochloric acid to form lysine amide dihydrochloride.
4. The method of claim 1 wherein an alkali metal caustic solution is added to the lysine amide-carbon dioxide adduct to form an alkali metal carbonate, and the lysine amide is extracted from the mixture by means of an organic solvent.
5. The method of claim 4 wherein the organic solvent is selected from the group consisting of $C_3$–$C_6$ alcohols, dioxane, dialkyl ethers of glycol, aromatic and alkyl aromatic hydrocarbons.
6. A solid adduct of lysine amide with carbon dioxide.

References Cited
UNITED STATES PATENTS 3,190,917  6/1965  Johnson et al. _____ 260—561 A

FOREIGN PATENTS 557,850  12/1943  Great Britain _____ 260—561 A
447,116  3/1948  Canada _____ 260—561 A

OTHER REFERENCES

Levin et al.: Biochem. Journ., 63, pp. 308–16.

LEWIS GOTTS, Primary Examiner

E. G. LOVE, Assistant Examiner